Sept. 10, 1957 R. R. SPARKS 2,805,480
PROTRACTOR WITH LEVEL AND ARM
Filed Nov. 8, 1954 2 Sheets-Sheet 1

Roby R. Sparks
INVENTOR.

Sept. 10, 1957  R. R. SPARKS  2,805,480
PROTRACTOR WITH LEVEL AND ARM
Filed Nov. 8, 1954  2 Sheets-Sheet 2

Roby R. Sparks
INVENTOR.

United States Patent Office 2,805,480
Patented Sept. 10, 1957

2,805,480

PROTRACTOR WITH LEVEL AND ARM

Roby R. Sparks, Erie, Pa.

Application November 8, 1954, Serial No. 467,262

1 Claim. (Cl. 33—88)

This invention generally relates to a measuring device and more specifically provides a protractor having a projecting arm and a level incorporated in the construction thereby forming a measuring device useful for many purposes.

An object of this invention is to provide a protractor having a level and a projecting arm wherein the arm may be adjusted in angular relation to the base of the protractor and locked in such adjusted position.

Another object of the present invention is to provide a protractor conformable to the preceding objects wherein the arm is secured to a rotatable circular plate and an annular tube is secured to the periphery of the plate and including a level bubble in its construction for determining the vertical position of the arm thereby providing a measuring device useful for many and various purposes and especially useful in carpentry and related arts.

Yet another object of the present invention is to provide a measuring device that may be used in various manners as a square, level, angle measuring device and as a substitute for a plumb-bob and plumb-line.

A still further object of the present invention is to provide a measuring device that is primarily adapted for use in carpentry and related arts wherein the device is especially adapted for measuring various angles and other desired geometric configurations.

Other important objects of the present invention will be found in its simplicity of construction, ease of operation, versatility, its adaptability and its relatively inexpensive manufacture.

These, together with other objects and advantages which will become consequently apparent reside in the details of construction and operation as more fully hereinafter described and claimed, reference being had to the accompanying drawings forming a part hereof, wherein like numerals refer to like parts throughout, and in which:

Figure 1:
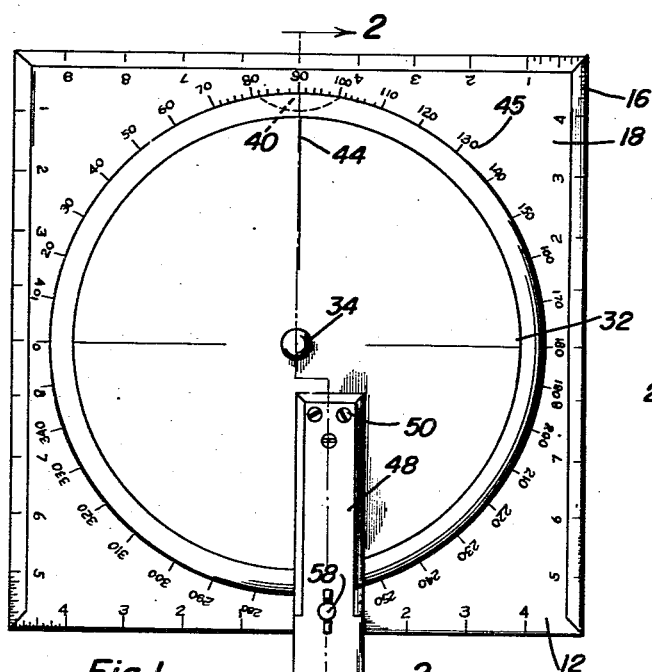
Figure 1 is a top plan view of the protractor with level and arm of the present invention.
Figure 2:
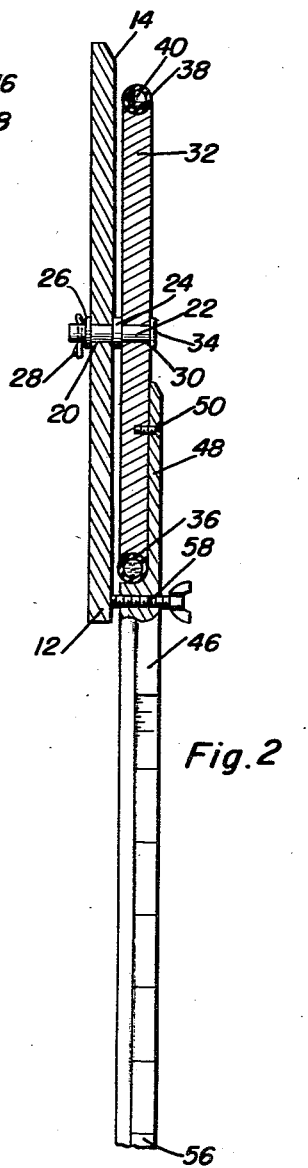
Figure 2 is a vertical, sectional view taken substantially upon a plane passing along section line 2—2 of Figure 1 showing the details of construction of the protractor and arm secured thereto together with the locking means for locking the arm in adjusted position.
Figure 3:
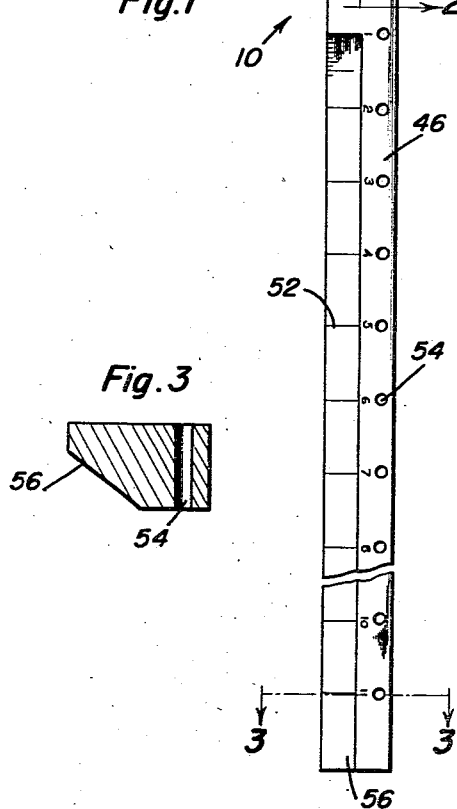
Figure 3 is a detailed sectional view taken substantially upon a plane passing along section line 3—3 of Figure 1 showing the details of construction of the apertures in the marking arm for use in inscribing a circle about a center point.

Referring now specifically to the drawings, it will be seen that the numeral 10 generally designates the protractor with level and arm of the present invention which includes a base member 12 that is illustrated as being square and provided with a bevel peripheral edge 14. The bevel peripheral edge 14 is provided with indicia 16 indicating units of length and numerical indicia 18 for designating these units of length. As illustrated, the base member 12 is square and is 10 inches or 10 units on each side. It will be understood that the device may be made in any suitable size and the indicia 16 and 18 arranged in various manners as desired for each individual installation. Also, the edges may be bevelled or retained in a square condition as desired.

Centrally of the base 12 is an aperture 20 receiving a pivot pin 22 extending therethrough and including a centrally disposed shoulder 24 engaging the upper surface of the base 12 and the pin 22 is held in the aperture 20 by a washer 26 and a suitable cotter pin 28. The other end of the pin 22 is rotatably journaled in an aperture 30 positioned centrally in a circular plate 32. The end of the pin 22 is provided with an enlarged head 34 for engaging the outer surface of the plate 32 and the flange 24 forms a spacer for spacing the plate 32 from the outer surface of the base 12 thereby rotatably supporting the plate 32 in relation to the base 12 for angular adjustment or rotation about the pivot pin 22.

The circular plate 32 is provided with a peripheral groove 36 receiving a tubular member 38. The tubular member 38 is annular and seated within the peripheral groove 36 on the plate 32. The tubular member 38 is constructed of transparent material for viewing a level bubble 40. In other words, the tubular member 38 is substantially filled with liquid except for the bubble area 40 thereby forming a spirit level that may be read at any point about the periphery of the plate 32. Preferably, the tube 38 is made of an unbreakable material inasmuch as the greater portion of the tube 38 is unprotected and subject to the possibility of damage from contact with various instrumentalities.

Positioned peripherally about the plate 32 on the upper face of the base 12 is degree indicia 45 having suitable markings and numerical values for use in conjunction with a reference or index line 44 thereby determining the angular relation between the plate 32 and the base 12.

Secured to and projecting radially from the plate 32 is an elongated arm 46 having an attaching portion 48 secured to the upper surface of the plate 32 by the fastening members 50. One edge of the arm 46 is provided with indicia 52 indicating units of measurement and the other edge of the elongated arm 46 is provided with a series of apertures 54 located coincidental to the indicia 52 wherein a marking device such as a pencil or the like may be inserted through the apertures 54 for marking a circle about the center defined by pin 22 when the base 12 is held stationary. The inner end of the arm is provided with undercut recess means for permitting passage of the tubular member 38. The lower edge of the arm 46 beneath the indicia 52 is bevelled as indicated by the numeral 56 and a screw threaded set screw 58 projects through the arm 46 adjacent the periphery of the plate 32 for engagement with the upper surface of the base 12 thereby providing a locking device for securing the arm 46 and plate 32 in angular adjusted position in relation to the base 12.

Figure 4:
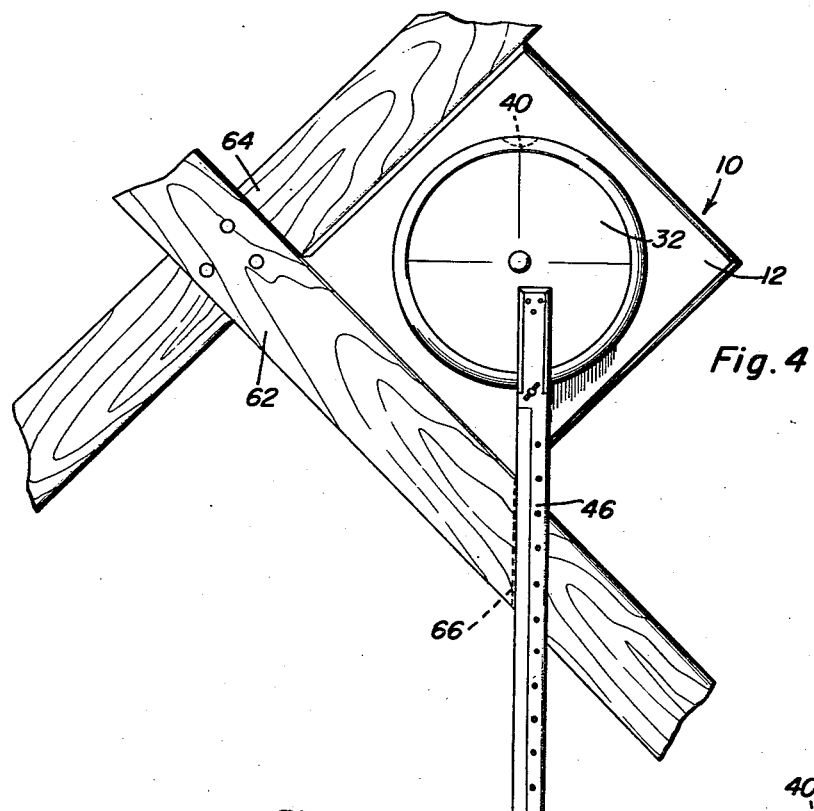
Figure 4 is a side elevational view showing the device of the present invention in use for scribing the cut of a rester.
Figure 5:
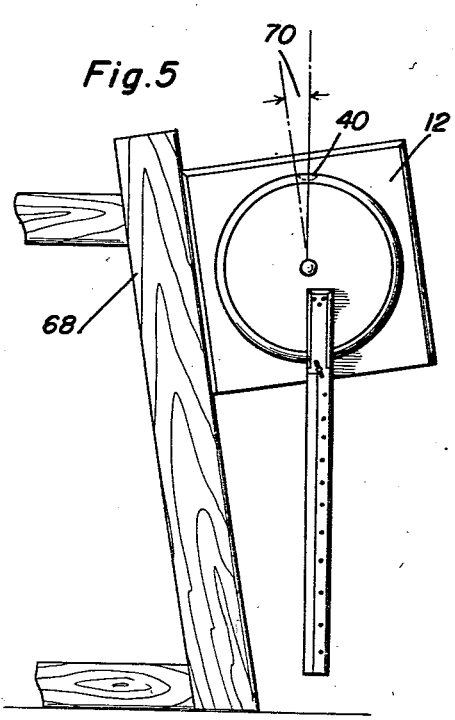
Figure 5 is a side elevational view showing the device utilized as a vertical level for determining the angular position of an inclined member.
Figure 6:
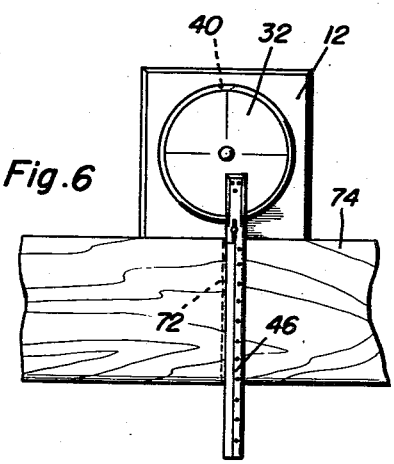
Figure 6 is a side elevational view showing the device of the present invention utilized as a horizontal level or for scribing a square line across a vertically disposed board.

Figures 4–6 show three different uses for the protractor 10 of the present invention. In Figure 4, the base 12 is positioned in the inner angle formed by the cross members 62 and 64 and a vertical line 66 is marked across the member 62 by following the leading edge of the arm 46 as bubble 40 will indicate the vertical relation of the arm 46. In Figure 5, the base 12 is positioned against an inclined member 68 and the position of the level bubble 40 will indicate the number of degress from vertical that the inclined member 68 is disposed. This number of degress will be indicated by the angle designated by the numeral 70. In Figure 6, the base 12 in conjunction with the plate 32 with the bubble 40 set in the desired position may be utilized as a horizontal level or the arm 46 may be utilized as a square for marking a vertical line 72 across a board 74 disposed on its edge in a vertical plane. It will be understood that by either presetting the angular position desired or reading the angular position after a measurement, the various angular relationships desired may be either measured or marked. Also, it will be understood that the device of the present invention is especially useful in conjunction with carpentry for cutting and marking rafters, locating and positioning a member in a vertical or horizontal disposition and marking various members for angular cuts and for marking out various geometric configurations in a most efficient and easy manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A protractor comprising a square base having degree indicia forming a circle thereon, a circular plate rotatably mounted on said base within the circle formed by the degree indicia, a laterally extending arm mounted on said plate, means for locking the arm and plate in adjusted angular position in relation to the base, and means for determining the angular relation between the plate and base, said plate being provided with a continuous annular spirit level disposed within the degree indicia on the base for indicating the vertical position of the arm at any angular position of the plate, said arm and side edges of the base being provided with measuring indicia, said angular relation determining means including an index line on said plate for coaction with the degree indicia on said base, said annular spirit level having a cylindrical cross-section and being seated in a peripheral groove in said plate, said arm having recess means at the inner end thereof for receiving a portion of the level for permitting continuity thereof.

References Cited in the file of this patent

UNITED STATES PATENTS

| | | |
|---|---|---|
| 798,717 | Weatherly | Sept. 5, 1905 |
| 1,972,122 | Woodyard | Sept. 4, 1934 |
| 2,180,509 | Dickson | Nov. 21, 1939 |
| 2,618,859 | Coleman | Nov. 25, 1952 |